US006848323B2

(12) United States Patent
Krouth et al.

(10) Patent No.: US 6,848,323 B2
(45) Date of Patent: Feb. 1, 2005

(54) HYDRAULIC ACTUATOR PISTON MEASUREMENT APPARATUS AND METHOD

(75) Inventors: Terrance F. Krouth, Eden Prairie, MN (US); David E. Wiklund, Eden Prairie, MN (US); Richard J. Habegger, Wolcottville, IN (US); Richard R. Hineman, Gunterville, AL (US)

(73) Assignee: Rosemount Inc., Eden Prairie, MN (US)

( * ) Notice: Subject to any disclaimer, the term of this patent is extended or adjusted under 35 U.S.C. 154(b) by 37 days.

(21) Appl. No.: 10/318,247

(22) Filed: Dec. 12, 2002

(65) Prior Publication Data

US 2003/0106381 A1 Jun. 12, 2003

Related U.S. Application Data

(63) Continuation of application No. 09/801,266, filed on Mar. 7, 2001, now abandoned.
(60) Provisional application No. 60/218,329, filed on Jul. 14, 2000, and provisional application No. 60/187,849, filed on Mar. 8, 2000.

(51) Int. Cl.[7] .................................................. G01F 1/38
(52) U.S. Cl. .................................................. 73/861.47
(58) Field of Search ......................... 73/861.42, 861.43, 73/861.44, 861.45, 861.46, 861.47, 861

(56) References Cited

U.S. PATENT DOCUMENTS

| | | | | |
|---|---|---|---|---|
| 1,480,661 A | | 1/1924 | Brown | |
| 1,698,314 A | | 1/1929 | Mapelsden | |
| 2,943,640 A | | 7/1960 | James | 137/594 |
| 3,160,836 A | | 12/1964 | Farley | 336/30 |
| 3,388,597 A | | 6/1968 | Bargen et al. | 73/398 |
| 3,430,489 A | | 3/1969 | Pfrehm | 73/231 |
| 3,494,190 A | | 2/1970 | Schwartzman | 73/228 |
| 3,561,831 A | | 2/1971 | Alibert et al. | 310/8.7 |
| 3,657,925 A | | 4/1972 | Gross | 73/239 |
| 3,678,754 A | | 7/1972 | Amir et al. | 73/419 |
| 3,727,520 A | | 4/1973 | McKown et al. | 91/433 |
| 3,817,283 A | | 6/1974 | Hewson | |
| 3,958,492 A | | 5/1976 | Curless | 91/363 R |
| 3,970,034 A | * | 7/1976 | Kirk | 116/266 |
| 4,031,813 A | | 6/1977 | Walters et al. | 91/433 |
| 4,100,798 A | | 7/1978 | Nilsson et al. | 73/194 E |
| 4,126,047 A | | 11/1978 | Sethares et al. | 73/505 |
| 4,193,420 A | | 3/1980 | Hewson | 137/356 |
| 4,205,592 A | | 6/1980 | Haüssler | 91/449 |
| 4,249,164 A | | 2/1981 | Tivy | 340/870.3 |

(List continued on next page.)

FOREIGN PATENT DOCUMENTS

| | | |
|---|---|---|
| DE | 31 16333 A1 | 4/1981 |
| DE | 3244668 | 6/1984 |
| DE | 4220333 | 12/1993 |

(List continued on next page.)

OTHER PUBLICATIONS

Office Communication for U.S. Appl. No. 10/317,311 filed Dec. 12, 2002, Date mailed: Dec. 24, 2003.
U.S. Appl. No. 09/395,688, filed Sep. 13, 1999, Kleven.
U.S. Appl. No. 09/394,728, filed Sep. 13, 1999, Kleven.

(List continued on next page.)

*Primary Examiner*—Max Noori
(74) *Attorney, Agent, or Firm*—Westman, Champlin & Kelly

(57) ABSTRACT

A method and device for use with a hydraulic system is adapted to measure a position, velocity and/or acceleration of a piston of a hydraulic actuator based upon differential pressure measurement. The device of the present invention utilizes a differential pressure flow sensor to establish a flow rate of a hydraulic fluid flow traveling into and out of a cavity of the hydraulic actuator, from which the position, velocity and acceleration of the piston can be determined.

33 Claims, 9 Drawing Sheets

U.S. PATENT DOCUMENTS

| | | | | | |
|---|---|---|---|---|---|
| 4,275,793 | A | | 6/1981 | Schivley, Jr. et al. | 173/9 |
| 4,281,584 | A | * | 8/1981 | Onken et al. | 91/1 |
| 4,304,136 | A | | 12/1981 | McCabe et al. | 73/861.54 |
| 4,319,492 | A | | 3/1982 | Hewson et al. | 73/756 |
| 4,381,699 | A | | 5/1983 | Haussler | 91/433 |
| 4,424,716 | A | | 1/1984 | Boehringer et al. | 73/861.56 |
| 4,436,348 | A | | 3/1984 | Farr | 303/115 |
| 4,466,290 | A | | 8/1984 | Frick | 73/756 |
| 4,520,660 | A | | 6/1985 | Hitchcock | 73/120 |
| 4,539,837 | A | * | 9/1985 | Barnaby | 73/54.06 |
| 4,539,967 | A | | 9/1985 | Nakajima et al. | 123/585 |
| 4,543,649 | A | * | 9/1985 | Head et al. | 367/96 |
| 4,545,406 | A | | 10/1985 | King | 137/553 |
| 4,557,296 | A | | 12/1985 | Byrne | 138/44 |
| 4,584,472 | A | | 4/1986 | Wiblin et al. | 250/237 G |
| 4,585,021 | A | | 4/1986 | Belknap | 137/100 |
| 4,588,953 | A | | 5/1986 | Krage | 324/58.5 C |
| 4,627,196 | A | | 12/1986 | Veale | 51/281 |
| 4,631,478 | A | | 12/1986 | Knetsch et al. | 324/207 |
| 4,671,166 | A | | 6/1987 | Glaze et al. | 91/361 |
| 4,689,553 | A | | 8/1987 | Haddox | 324/58.5 C |
| 4,737,705 | A | | 4/1988 | Bitar et al. | 324/58.5 C |
| 4,742,794 | A | | 5/1988 | Hagstrom | 114/286 |
| 4,744,218 | A | | 5/1988 | Edwards et al. | 60/368 |
| 4,745,810 | A | | 5/1988 | Pierce et al. | 73/706 |
| 4,749,936 | A | | 6/1988 | Taplin | 324/58.5 B |
| 4,751,501 | A | | 6/1988 | Gut | 340/607 |
| 4,757,745 | A | | 7/1988 | Taplin | 91/361 |
| 4,774,465 | A | | 9/1988 | Nilius | 324/208 |
| 4,841,776 | A | | 6/1989 | Kawachi et al. | 73/706 |
| 4,866,269 | A | | 9/1989 | Wlodarczyk et al. | 250/231 |
| 4,901,628 | A | | 2/1990 | Krage | 92/5 T |
| 4,932,269 | A | | 6/1990 | Cammarata, III et al. | 73/861.61 |
| 4,938,054 | A | | 7/1990 | Dye et al. | 73/3 |
| 4,947,732 | A | * | 8/1990 | Hidenobu | 91/363 R |
| 4,961,055 | A | | 10/1990 | Habib et al. | 324/662 |
| 4,987,823 | A | | 1/1991 | Taplin et al. | 91/361 |
| 5,000,650 | A | | 3/1991 | Brewer et al. | 414/699 |
| 5,031,506 | A | | 7/1991 | Baisch et al. | 91/363 R |
| 5,036,711 | A | | 8/1991 | Good | 73/861.66 |
| 5,072,198 | A | | 12/1991 | Taplin et al. | 333/33 |
| 5,085,250 | A | | 2/1992 | Kendrick | 138/44 |
| 5,104,144 | A | | 4/1992 | Bethell | 280/707 |
| 5,150,049 | A | | 9/1992 | Schuetz | 324/207.12 |
| 5,150,060 | A | | 9/1992 | Bitar | 324/635 |
| 5,182,979 | A | | 2/1993 | Morgan | 92/5 R |
| 5,182,980 | A | | 2/1993 | Greer | 92/5 R |
| 5,218,820 | A | | 6/1993 | Sepehri et al. | 60/463 |
| 5,218,895 | A | | 6/1993 | Lukich et al. | 91/361 |
| 5,233,293 | A | | 8/1993 | Huang et al. | 324/207.15 |
| 5,241,278 | A | | 8/1993 | Bitar | 324/635 |
| 5,247,172 | A | | 9/1993 | Riemer | 250/227.21 |
| 5,260,665 | A | | 11/1993 | Goldberg et al. | 324/636 |
| 5,274,271 | A | | 12/1993 | McEwan | 307/108 |
| 5,313,871 | A | | 5/1994 | Kaneko et al. | 91/361 |
| 5,325,063 | A | | 6/1994 | Morgan | 324/636 |
| 5,332,938 | A | | 7/1994 | McEwan | 307/572 |
| 5,345,471 | A | | 9/1994 | McEwan | 375/1 |
| 5,361,070 | A | | 11/1994 | McEwan | 342/21 |
| 5,365,795 | A | | 11/1994 | Brower, Jr. | 73/861.65 |
| 5,422,607 | A | | 6/1995 | McEwan | 333/20 |
| 5,424,941 | A | | 6/1995 | Bolt et al. | 364/148 |
| 5,438,261 | A | | 8/1995 | Codina et al. | 324/207.16 |
| 5,438,274 | A | | 8/1995 | Bitar et al. | 324/636 |
| 5,455,769 | A | | 10/1995 | Panoushek et al. | 364/424.07 |
| 5,457,394 | A | | 10/1995 | McEwan | 324/642 |
| 5,457,960 | A | | 10/1995 | Morishita | 91/361 |
| 5,461,368 | A | | 10/1995 | Comer | 340/607 |
| 5,465,094 | A | | 11/1995 | McEwan | 342/28 |
| 5,469,749 | A | | 11/1995 | Shimada et al. | 73/861.47 |
| 5,471,147 | A | | 11/1995 | Allen et al. | 324/635 |
| 5,471,162 | A | | 11/1995 | McEwan | 327/92 |
| 5,479,120 | A | | 12/1995 | McEwan | 327/91 |
| 5,491,422 | A | | 2/1996 | Bitar et al. | 324/636 |
| 5,510,800 | A | | 4/1996 | McEwan | 342/387 |
| 5,512,834 | A | | 4/1996 | McEwan | 324/642 |
| 5,517,198 | A | | 5/1996 | McEwan | 342/89 |
| 5,519,342 | A | | 5/1996 | McEwan | 327/94 |
| 5,519,400 | A | | 5/1996 | McEwan | 342/28 |
| 5,521,600 | A | | 5/1996 | McEwan | 342/27 |
| 5,523,760 | A | | 6/1996 | McEwan | 342/89 |
| 5,535,587 | A | | 7/1996 | Tanaka et al. | 60/427 |
| 5,536,536 | A | | 7/1996 | Kelley | 427/386 |
| 5,540,137 | A | | 7/1996 | Lark et al. | 92/5 R |
| 5,563,605 | A | | 10/1996 | McEwan | 342/202 |
| 5,573,012 | A | | 11/1996 | McEwan | 128/782 |
| 5,576,498 | A | | 11/1996 | Shambayati | 73/861.52 |
| 5,576,627 | A | | 11/1996 | McEwan | 324/639 |
| 5,581,256 | A | | 12/1996 | McEwan | 342/37 |
| 5,587,536 | A | | 12/1996 | Rasmussen | 73/744 |
| 5,589,838 | A | | 12/1996 | McEwan | 342/387 |
| 5,602,372 | A | | 2/1997 | Strelow | 200/81.9 R |
| 5,609,059 | A | | 3/1997 | McEwan | 73/290 R |
| 5,617,034 | A | | 4/1997 | Lark et al. | 324/635 |
| 5,661,277 | A | | 8/1997 | Graham, II | 200/81.9 R |
| 5,710,514 | A | | 1/1998 | Crayton et al. | 324/635 |
| 5,773,726 | A | | 6/1998 | Mahoney et al. | 73/861.65 |
| 5,817,950 | A | | 10/1998 | Wiklund et al. | 73/861.66 |
| 5,861,546 | A | | 1/1999 | Sagi et al. | 73/40.5 |
| 5,879,544 | A | | 3/1999 | Cassidy | 210/90 |
| 5,901,633 | A | | 5/1999 | Chan et al. | 92/5 R |
| 5,977,778 | A | | 11/1999 | Chan et al. | 324/635 |
| 6,142,059 | A | | 11/2000 | Chan et al. | 92/5 R |
| 6,158,967 | A | * | 12/2000 | Dupre | 417/53 |
| 6,269,641 | B1 | | 8/2001 | Dean | 60/567 |
| 6,286,412 | B1 | | 9/2001 | Manring et al. | 91/433 |
| 6,412,483 | B1 | * | 7/2002 | Jones et al. | 128/205.11 |
| 6,575,264 | B2 | * | 6/2003 | Spadafora | 180/422 |

FOREIGN PATENT DOCUMENTS

| | | |
|---|---|---|
| DE | G 94 17 204.8 | 10/1994 |
| DE | 0 686 831 A2 | 12/1995 |
| DE | 29616034 | 2/1997 |
| EP | 0154531 | 9/1985 |
| EP | 0 266 606 A2 | 10/1987 |
| EP | 0309643 | 4/1989 |
| EP | 0331772 | 9/1989 |
| EP | 0 887 626 A1 | 6/1998 |
| FR | 2485724 | 12/1981 |
| GB | 1080852 | 8/1967 |
| GB | 1467957 | 3/1977 |
| GB | 2011997 | 7/1979 |
| GB | 2155635 | 9/1985 |
| GB | 2 172 995 A | 10/1986 |
| GB | 2259147 | 3/1993 |
| GB | 2 301 676 | 12/1996 |
| JP | 0168106 | 10/1982 |
| JP | 57-198823 | 12/1982 |
| JP | 6160605 | 7/1986 |
| JP | 63070121 | 3/1988 |
| JP | 01207634 | 11/1989 |
| JP | 04-225126 | 8/1992 |
| JP | 0168107 | 10/1992 |
| JP | 06-213694 | 1/1994 |
| WO | WO 96/24028 | 8/1996 |
| WO | WO 98/23867 | 6/1998 |

OTHER PUBLICATIONS

Nishimoto T. et al., article entitled "Buried Piezoresistive sensors by means of MeV ion implantation", *Sensors and Actuators*, May 1994, vol. A43, no. 1/3, pp. 249–253.

Process Instrument Engineers Handbook, Revised Edition, Chapters 2.10, 2.11, and 2.12, pp. 87–110 (1982).

Model 8800A Vortex Flowmeter, Key Differentiators (undated).

Model 1195 Integral Orifice Assembly, Rosemount Catalog pp. Flow–125–Flow 137 (Published 1995).

Model 8800 Smart Vortex Flowmeter, Fisher–Rosemount, Managing the Process Better, pp. 2–19, (1994).

Model 8800A Smart Vortex Flowmeter, Fisher–Rosemount, Managing the Process Better, pp. 2–21 (1997).

On–Line Catalog Level and Flow Instrumentation—Flow Gauges, Industrial Process measurement, Inc., re: RCM Industries, Inc. products, 6 pages.

Kobold, re: RCM Industries, Inc. products, pp. 13–18.

"A Physicist's Desk Reference", *American Institute of Physics*, New York, 1992, p. 201.

"Handbook of Chemistry and Physics", CRC Press, Ohio, 1975, p. E–223.

"The Electrical Engineering Handbook", Editor–in–Chief, R. Dorf, CRC Press, 1997, pp. 811–812.

Brochure: Technik, "Absolute Position Measurement Using Conducive Plastic Potentiometers".

Brochure: Penny+ Giles "Technology Leaders in Displacement Monitoring & Manual Control".

Brochure: DC Hydrostar, "Position Transducer".

"An LVDT Primer", *SENSORS*, Jun. 1996, pp. 27–30.

"Understanding Magnetostrictive LDTs", W.D. Peterson, *Hydraulics & Pneumatics*, Feb. 1993, pp. 32–34.

Brochure: Penny+ Giles Product Data, "Cylinder Transducer Model HLP100".

Magazine: "Not Just a Blip on the Screen", *Business Week*, Feb. 19, 1996, pp. 64–65.

International Search Report from International Application No. PCT/US 02/15311, filed May 15, 2002. Date of report Aug. 5, 2002.

U.S. Appl. No. 09/521,132, entitled "Piston Position Measuring Device," filed Mar. 8, 2000.

U.S. Provisional Appl. No. 60/218,329, entitled "Hydraulic Valve Body with Differential Pressure Flow Measurement," filed Jul. 14, 2000.

U.S. Appl. No. 90/521,537, entitled "Bi–Directional Differential Pressure Flow Sensor," filed Mar. 8, 2000.

U.S. Provisional Appl. No. 60/187,849, entitled "System for Controlling Multiple Hydraulic Cylinders," filed Mar. 8, 2000.

* cited by examiner

HYDRAULIC ACTUATOR PISTON MEASUREMENT APPARATUS AND METHOD

CROSS-REFERENCE TO RELATED APPLICATION

This is a continuation of U.S. patent application Ser. No. 09/801,266, filed Mar. 7, 2001, now abandoned and entitled "HYDRAULIC ACTUATOR PISTON MEASUREMENT APPARATUS AND METHOD," and claims the benefit of U.S. patent application Ser. No. 09/521,132, entitled "PISTON POSITION MEASURING DEVICE," filed Mar. 8, 2000, and U.S. Provisional Application No. 60/218,329, entitled "HYDRAULIC VALVE BODY WITH DIFFERENTIAL PRESSURE FLOW MEASUREMENT," filed Jul. 14, 2000. In addition, the present invention claims the benefit of U.S. patent application Ser. Nos. 09/521,537, entitled "BI-DIRECTIONAL DIFFERENTIAL PRESSURE FLOW SENSOR," filed Mar. 8, 2000 and 60/187,849, entitled "SYSTEM FOR CONTROLLING MULTIPLE HYDRAULIC CYLINDERS," filed Mar. 8, 2000.

BACKGROUND OF THE INVENTION

The present invention relates to hydraulic systems. More particularly, the present invention relates to position, velocity, and acceleration measurement of a hydraulic actuator piston of a hydraulic system based upon a differential pressure measurement.

Hydraulic systems are used in a wide variety of industries ranging from road construction to processing plants. These systems are generally formed of hydraulic valves and hydraulic actuators. Typical hydraulic actuators include a hydraulic cylinder containing a piston and a rod that is attached to the piston at one end and to an object at the other end. The hydraulic valves direct hydraulic fluid flows into and out of the hydraulic actuators to cause a change in the position of the piston within the hydraulic cylinder and produce a desired actuation of the object. For many applications, it would be useful to know the position, velocity, and/or acceleration of the piston. By these variables, a control system could control the location or orientation, velocity and acceleration of the objects being actuated by the hydraulic actuators. For example, a blade of a road grading machine could be repeatedly positioned as desired resulting in more precise grading.

One technique of determining the piston position is described in U.S. Pat. No. 4,588,953 which correlates resonances of electromagnetic waves in a cavity, formed between a closed end of the hydraulic cylinder and the piston, with the position of the piston within the hydraulic cylinder. Other techniques use sensors positioned within the hydraulic cylinder to sense the position of the piston. Still other techniques involve attaching a cord carried on a spool to the piston where the rotation of the spool relates to piston position.

There is an on-going need for methods and devices which are capable of achieving accurate, repeatable, and reliable hydraulic actuator piston position measurement. Furthermore, it would be desirable for these methods and devices to measure the velocity and acceleration of the hydraulic actuator piston.

SUMMARY

A method for measuring position, velocity, and/or acceleration of a piston, which is slidably contained within a hydraulic cylinder of a hydraulic actuator is provided. In addition, a device that is adapted to implement the method of the present invention within a hydraulic system is provided. The method involves measuring a differential pressure across a discontinuity positioned in a hydraulic fluid flow which is related to the position, velocity, and acceleration of the piston. The position, velocity, and/or acceleration is then calculated as a function of the differential pressure measurement.

The device includes a differential pressure flow sensor and a calculating module. The differential pressure flow sensor is adapted to measure the differential pressure and produce a first signal that is indicative of a flow rate of the hydraulic fluid flow. The calculation module is adapted to receive the first signal and responsively provide a second signal, which is of the position, velocity, and/or acceleration of the piston.

BRIEF DESCRIPTION OF THE DRAWINGS

Elements of the figures which are identified by the same or similar labels are intended to represent the same or similar elements.

DETAILED DESCRIPTION

The present invention provides a method and device for use with a hydraulic system to measure the position, velocity and/or acceleration of a piston of a hydraulic actuator-based upon differential pressure measurement. In general, the present invention utilizes a differential pressure flow sensor to establish a flow rate of a hydraulic fluid flow traveling into and out of a cavity of the hydraulic actuator, from which the position, velocity and acceleration of the piston can be determined. The position of the piston is directly related to a volume of hydraulic fluid that is contained in a cavity of the hydraulic actuator. The velocity of the piston is directly related to the flow rate of the hydraulic fluid flow. Finally, the acceleration of the piston is directly related to the rate of change of the flow rate of the hydraulic fluid flow.

Figure 1:
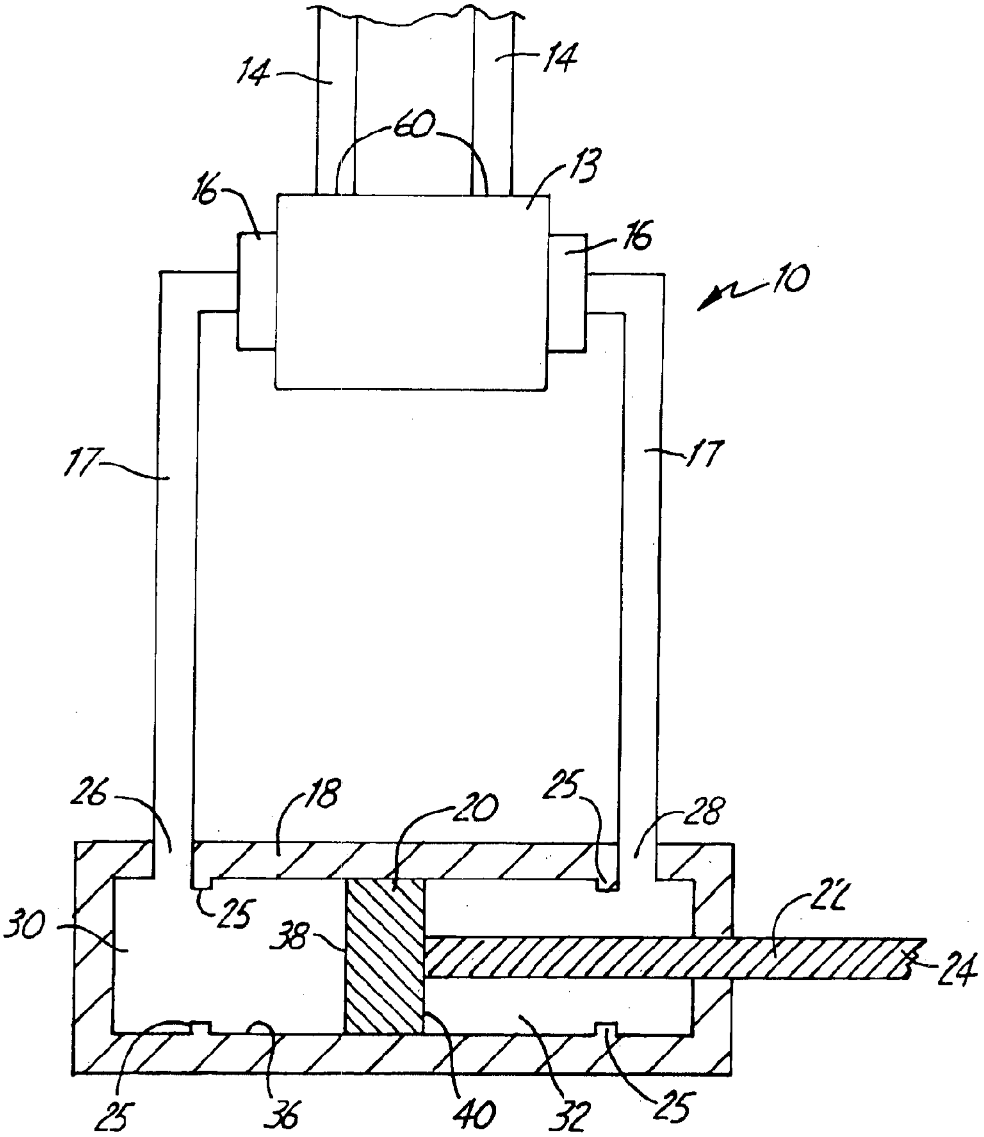
FIG. 1 PRIOR ART
FIG. 1 is a simplified block diagram of an example of a hydraulic system, in accordance with the prior art, to which the present invention can be applied.

FIG. 1 shows a simplified block diagram of an example of a prior art hydraulic system 10, to which embodiments of the present invention can be applied. Hydraulic system 10 generally includes at least one hydraulic actuator 12, hydraulic control valve 13, and a sources of high and low pressure hydraulic fluid (not shown) delivered through, for example, hydraulic lines 14. Hydraulic control valve 13 is generally adapted to control a flow of hydraulic fluid into and out of cavities of hydraulic actuator 12, which are fluidically coupled to a ports 16 through fluid flow conduit 17. Alternatively, hydraulic control valve 13 could be configured to control hydraulic fluid flows into and out of multiple hydraulic actuators 12. Hydraulic control valve 13 could be, for example, a spool valve, or any other type of valve that is suitable for use in a hydraulic system.

The depicted hydraulic actuator 12 is intended to be an example of a suitable hydraulic actuator to which embodiments of the present invention may be applied. Hydraulic actuator 12 generally includes hydraulic cylinder 18, piston 20, and rod 22. Piston 20 is attached to rod 22 and is slidably contained within hydraulic cylinder 18. Rod 22 is further attached to an object (not shown) at end 24 for actuation by hydraulic actuator 12. Piston stops 25 can be used to limit the range of motion of piston 20 within hydraulic cylinder 18. Examples suitable hydraulic actuators 12 will be discussed in greater detail with reference to FIGS. 2A and 2B.

Figure 2A:
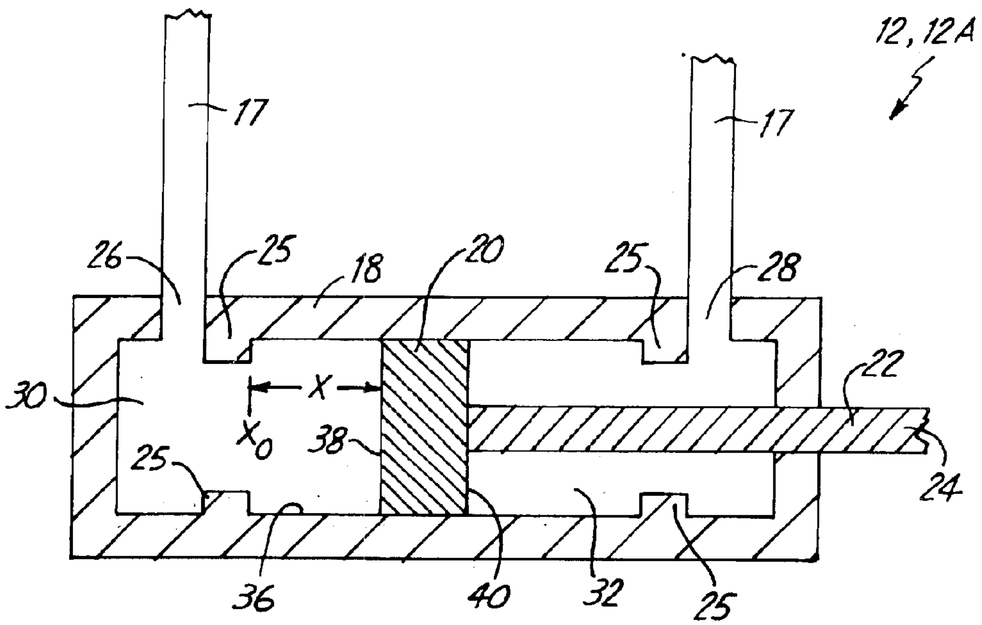
FIG. 2A PRIOR ART
FIGS. 2A and 2B show simplified block diagrams of examples of hydraulic actuators, as found in the prior art, to which the present invention can be applied.

Hydraulic actuator 12A, shown in FIG. 2A, includes first and second ports 26 and 28, respectively, which are adapted to direct a hydraulic fluid flow into and out of first and second cavities 30 and 32, respectively, through fluid flow conduit 17. First cavity 30 is defined by interior wall 36 of hydraulic cylinder 18 and surface 38 of piston 20. Second cavity 32 is defined by interior wall 36 of hydraulic cylinder 18 and surface 40 of piston 20. First and second cavities 30 and 32 of hydraulic actuator 12A are completely filled with hydraulic fluid and the position of piston 20 is directly related to the volume of either first cavity 30 or second cavity 32 and thus, the volume of hydraulic fluid contained in first cavity 30 or second cavity 32. As pressurized hydraulic fluid is forced into first cavity 30, piston 20 is forced to slide to the right thereby decreasing the volume of second cavity 32 and causing hydraulic fluid to flow out of second cavity 32 through second port 28. Similarly, as pressurized hydraulic fluid is pumped into second cavity 32, piston 20 is forced to slide to the left thereby decreasing the volume of first cavity 30 and causing hydraulic fluid to flow out of first cavity 30 through first port 26.

Figure 2B:
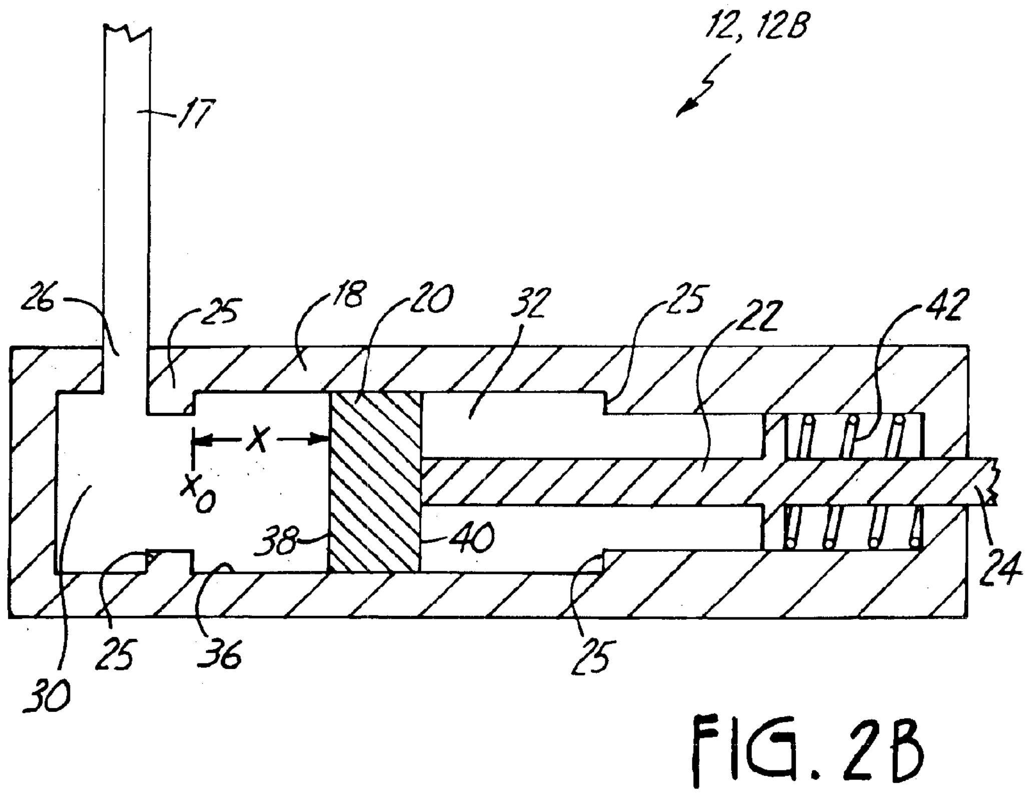
FIG. 2B PRIOR ART

Hydraulic actuator 12B, shown in FIG. 2B, includes only first port 26 through which hydraulic fluid flows into and out of first cavity 30. A spring 42 is adapted to exert a force on rod 22 to bias piston 20 toward first port 26. As hydraulic fluid is pumped into first cavity 30, piston 20 is forced to slide to the right thereby decreasing the volume of second cavity 32 and compressing spring 42. As hydraulic fluid is pumped out of first cavity 30, spring 42 expands and piston 20 slides to the left. Here, the position of piston 20 is directly related to the volume of hydraulic fluid contained within first cavity 30.

The present invention provides piston position, velocity, and/or acceleration measurement based upon a differential pressure measurement taken within the hydraulic fluid flow traveling into and out of first cavity 30 of hydraulic cylinder 12. Those skilled in the art understand that the following method and equations could be equally applied to hydraulic fluid flows traveling into and out of second cavity 32 of hydraulic actuator 12A. As mentioned above, a position x of piston 20 is directly related to the volume $V_1$ of hydraulic fluid contained within first cavity 30. This relationship is shown in the following equation:

$$x = \frac{V_1 - V_0}{A_1} \qquad \text{Eq. 1}$$

where $A_1$ is the cross-sectional area of first cavity 30 and $V_0$ is the volume of first cavity 30 that is never occupied by piston 20 due to the stops 25 positioned to the left of piston 20.

As the hydraulic fluid is pumped into or out of first cavity 30, the position x of piston will change. For a given reference or initial position $x_0$ of piston 20, a new position x can be determined by calculating the change in volume $\Delta V_1$ of first cavity 30 over a period of time $t_0$ to $t_1$ in accordance with the following equations:

$$\Delta V_1 = \int_{t0}^{t1} Q_{v1} \qquad \text{Eq. 2}$$

$$x = x_0 + \frac{\Delta V_1}{A_1} = x_0 + \frac{1}{A_1}\int_{t0}^{t1} Q_{v1} \qquad \text{Eq. 3}$$

where $Q_{V1}$ is the volumetric flow rate of the hydraulic fluid flow into or out of first cavity 30. Although, the reference position $x_0$ for the above example as shown in FIGS. 2A and 2B as being set at the left most stops 25, other reference positions are possible as well. A similar method can be used to determine the position of piston 20 of hydraulic actuator 12A based upon a the volume of hydraulic fluid contained in second cavity 32.

The velocity at which the position x of piston 20 changes is directly related to the volumetric flow rate $Q_{V1}$ of the hydraulic fluid flow into or out of first cavity 30. The velocity υ of piston 20 can be calculated by taking the derivative of Eq. 3, which is shown in the following equation:

$$v = \frac{dx}{dt} = \frac{Q_{v1}}{A_1} \qquad \text{Eq. 4}$$

Finally, the acceleration of piston 20 is directly related to the rate of change of the flow rate $Q_{V1}$, as shown in Eq. 5 below. Accordingly, by measuring the flow rate $Q_{V1}$ flowing into and out of first cavity 30, the position, velocity, and acceleration of piston 20 can be calculated.

$$a = \frac{dv}{dt} = \frac{d}{dt}\left(\frac{dx}{dt}\right) = \frac{1}{A_1}\left(\frac{dQ_{v1}}{dt}\right) \qquad \text{Eq. 5}$$

Figure 3:
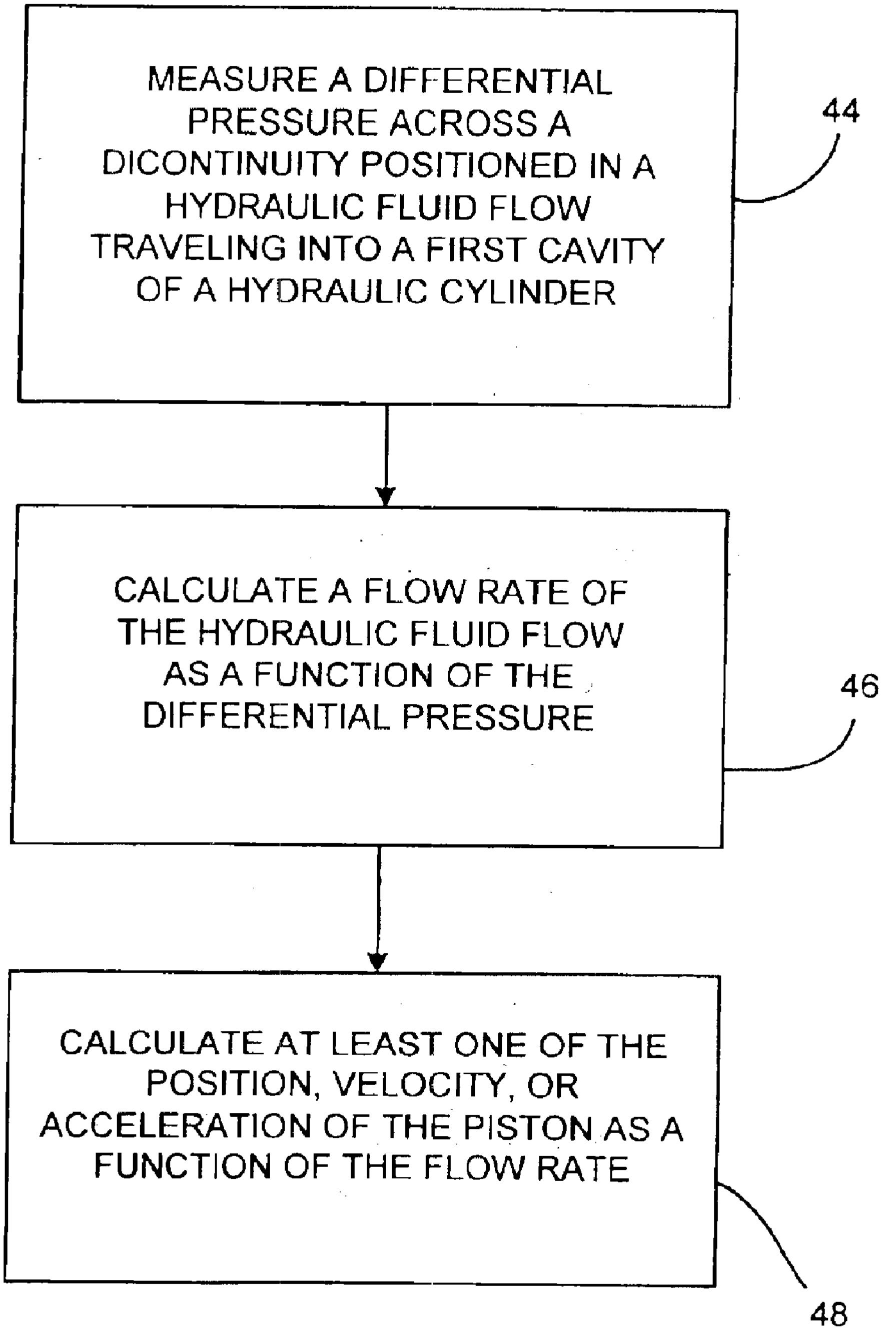
FIG. 3 is a flowchart illustrating a method of measuring position, velocity and/or acceleration of a piston of a hydraulic actuator, in accordance with an embodiment of the present invention.

The general method of the present invention for measuring the position, velocity, and/or acceleration of piston 20 of hydraulic actuator 12 is illustrated in the flowchart shown in FIG. 3. At step 44, the differential pressure across a discontinuity positioned in a hydraulic fluid flow travelling into or out of first cavity 30 of hydraulic cylinder 18 is measured. Next, at step 46, a flow rate $Q_V$ of the hydraulic fluid flow is calculated as a function of the differential pressure measurement using methods which are known in the art. Finally, the position, velocity, and/or acceleration of piston 20 is calculated as a function of the flow rate $Q_V$, at step 48, in accordance with the above equations. The position, velocity, and acceleration information can be provided to a control system, which can use the information to control the objects being actuated by hydraulic actuator 12.

Figure 4:
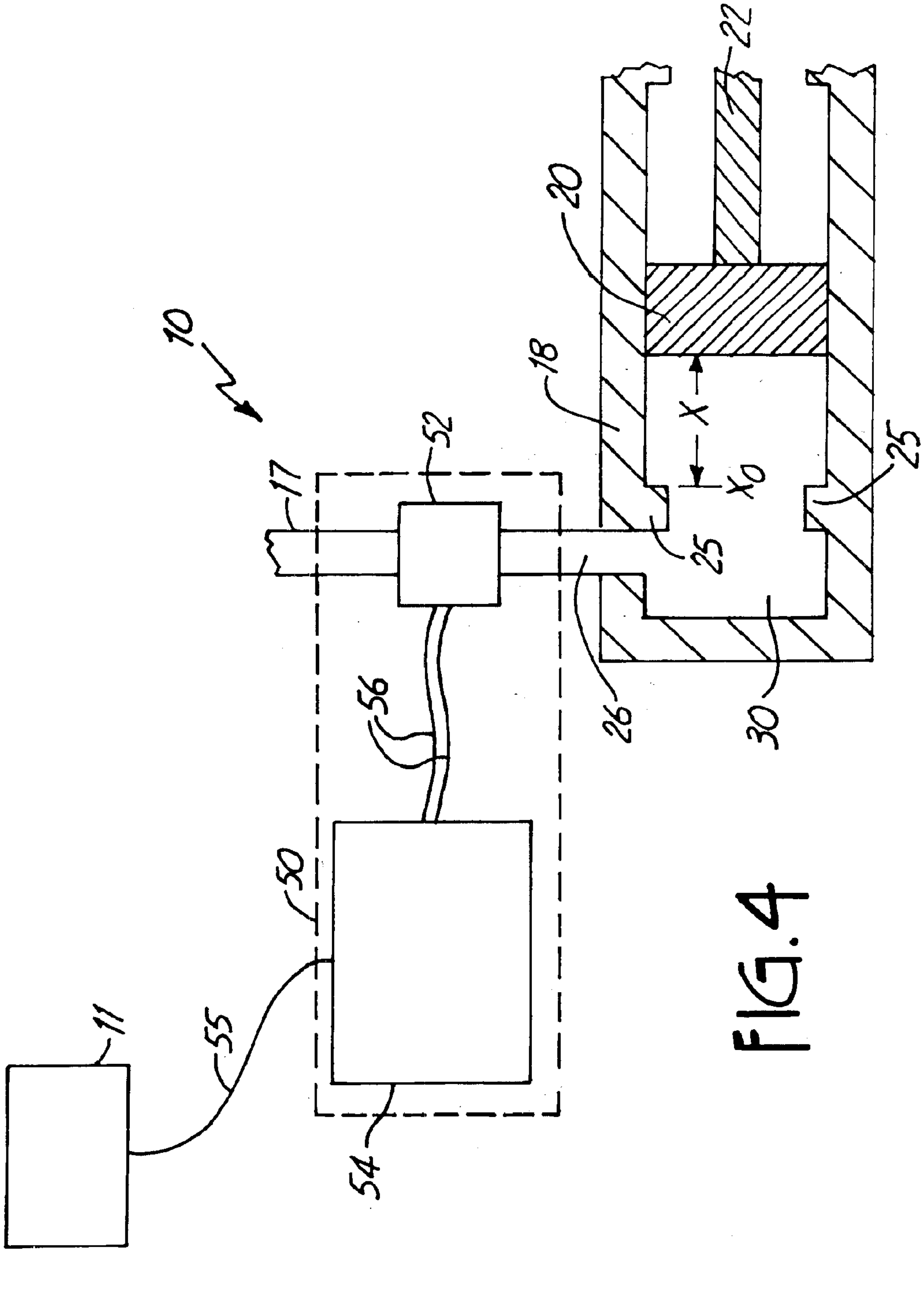
FIG. 4 shows a simplified block diagram of a device for measuring piston position, velocity and/or acceleration, in accordance with embodiments of the present invention.

Implementation of the above method can be accomplished using measuring device 50, an embodiment of which is shown in FIG. 4. Measuring device 50 generally includes a differential pressure flow sensor 52 and a calculation module 54. Differential pressure flow sensor 52 is coupled to conduit 17 and is adapted to measure a pressure drop across a discontinuity placed in the hydraulic fluid flow. The differential pressure sensor produces a first signal, based upon the pressure drop, which is indicative of the flow rate $Q_{V1}$ of the hydraulic fluid flow flowing into and out of first cavity 30. Calculation module 54 is adapted to receive the first signal from differential pressure flow sensor 52 over a suitable physical connection, such as wires 56, or a wireless connection, in accordance with a communication protocol. The first signal can be a differential pressure signal relating to the pressure drop across the discontinuity, a flow rate signal relating to the flow rate $Q_{V1}$, a compensated pressure drop signal, or a compensated flow rate signal. The compensated pressure drop and flow rate signals are generated in response to, for example, the temperature of the hydraulic fluid, a static pressure measurement, or other parameter that affects the pressure drop measurement or the relationship between the pressure drop and the flow rate $Q_{V1}$.

Calculation module 54 is generally adapted to produce a second signal, based upon the first signal, that is indicative of the position, velocity, and/or acceleration of piston 20. The second signal is preferably provided to control system 11 over a physical connection, such as wire 55, or a wireless connection, in accordance with a communication protocol. Calculation module can be an integrated into differential pressure flow sensor 52, separated from differential pressure flow sensor 52, or located within control system 11. If necessary, calculation module can calculate the flow rate $Q_{V1}$ of the hydraulic fluid flow, when the first signal is a differential pressure signal, based upon various parameters of the hydraulic fluid flow, the geometry of the object forming the discontinuity, and other parameters in accordance with known methods. Calculation module 54 samples the varying flow rate $Q_{V1}$ at a sufficiently high rate to maintain an account of the current volume $V_1$ of first cavity 30 or position $x_0$. This information can then be used to establish the position x of piston 20 using Eqs. 1–3 above. The flow rate $Q_{V1}$ can also be used to calculate the velocity and acceleration of piston 20 in accordance with Eqs. 4 and 5 above, respectively.

In this manner, control system 11 can obtain piston position, velocity, and acceleration information, which can be used in the control of hydraulic actuator 12. Furthermore, hydraulic system 10 can incorporate multiple measuring devices 50 to monitor the position, velocity, and acceleration of pistons 20 of multiple hydraulic actuators 12. Thus, control system 11 can use the information to coordinate the actuation of multiple hydraulic actuators 12.

Measuring device 50 can be configured to filter or compensate the first or second signal for anomalies that develop in the system. For example, the starting and stopping of piston 20 can cause anomalies to occur in the hydraulic fluid flow which are detected in the form of transients in the pressure drop. These errors can be filtered by differential pressure flow sensor 52 or calculation module 54. Alternatively, control system 11 can be configured to provide the necessary compensation.

Figure 5:
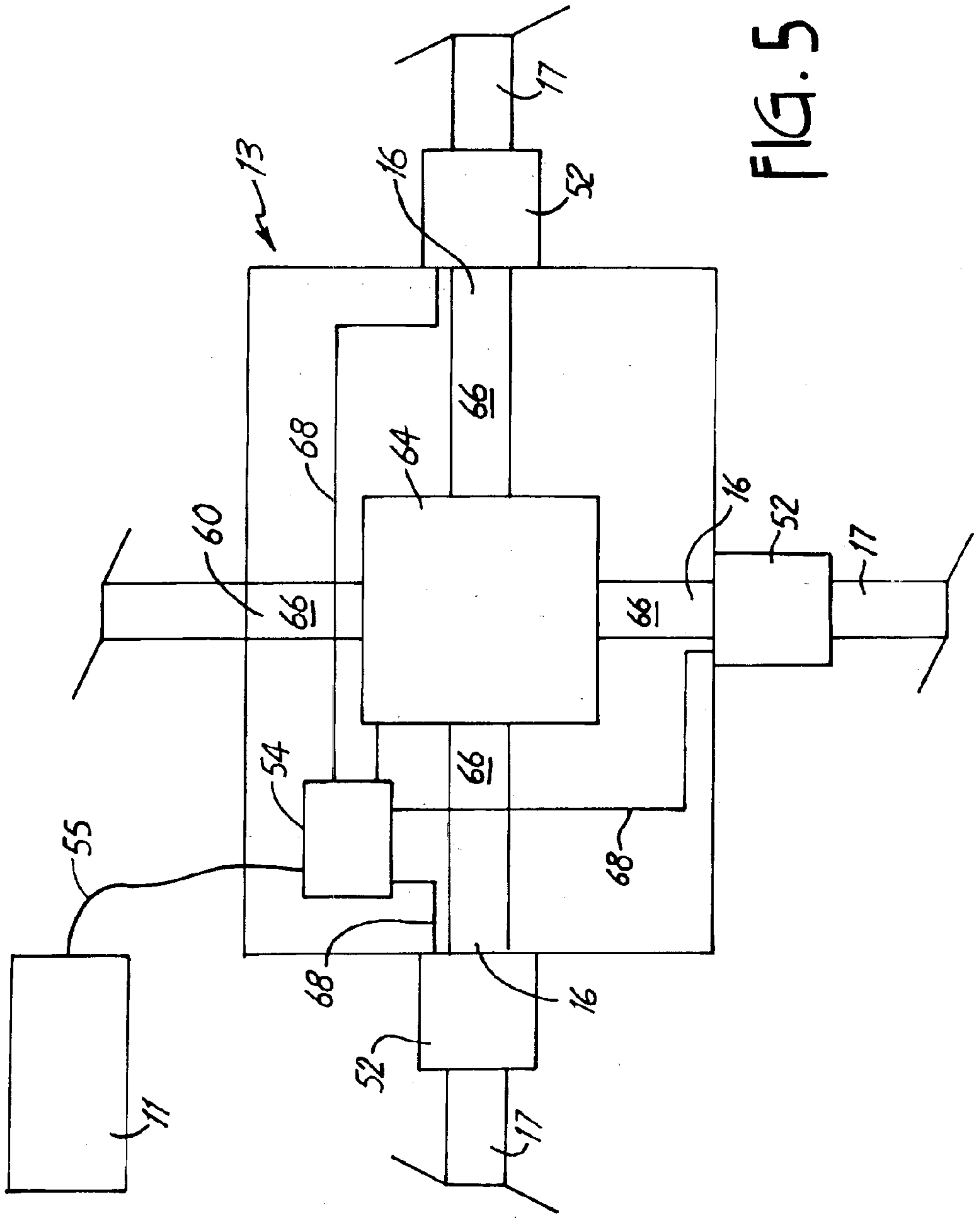
FIG. 5 is a simplified block diagram of an example of a hydraulic control valve including a device for measuring piston position, velocity and/or acceleration, in accordance with embodiments of the present invention.

FIG. 5 shows a simplified block diagram of a hydraulic control valve 13 which includes various additional embodiments of the invention.

Hydraulic control valve 13 generally includes at least one port 60 that is fluidically coupled to a source of hydraulic fluid, valve body 62, flow control member 64, and at least one port 16 that is inline with a cavity of a hydraulic actuator, such as first cavity 30 (FIGS. 2A and 2B). Ports 16 and 60 are placed inline with flow control member 64 through fluid flow passageways 66. Flow control member 64 is contained within valve body 62 and is adapted to control hydraulic fluid flows through ports 16 and 60 using methods that are known to those skilled in the art. Here, at least one flow sensor 52 of measuring device 50 is placed proximate a port 16 or 60 to measure the flow rate of the hydraulic fluid passing therethrough. Calculation module 54 can be a formed within valve body 62, attached to valve body 62, or separated from valve body 62. Here, calculation module 54 is adapted to receive first signals from one or more flow sensors 52 through a suitable physical connection, such as wires 68, and produce the second signal that can be provided to control system 11 over a physical (e.g., wire 14) or a wireless connection as described above. Furthermore, calculation module 54 can be adapted to control flow control member 64 in response to control signals from control system 11.

In one embodiment, flow sensor 52 of measuring device 50 is positioned proximate at least one port 16 of hydraulic control valve 13 to monitor the flow rate of the hydraulic fluid flow into first cavity 30 (or second cavity 32) of hydraulic actuator 12. Flow sensors 52 can also be placed at each port 16 to monitor hydraulic fluid flows to different hydraulic actuators 12. Alternatively, a pair of flow sensors 12 can monitor a single direction of the fluid flow to a hydraulic actuator 12 or be used as a redundant pair whose measurements can be verified by comparison. Here, the comparison can be used for diagnostic purposes (e.g., leak detection). In another embodiment (not depicted), flow sensor 52 could be positioned proximate port 60, which couples hydraulic control valve 13 to a high or low pressure source of hydraulic fluid, to establish the flow rate of hydraulic fluid into and out of hydraulic control valve 13, which in turn can be used to measure the position, velocity, and acceleration of a piston 20.

Figure 6:
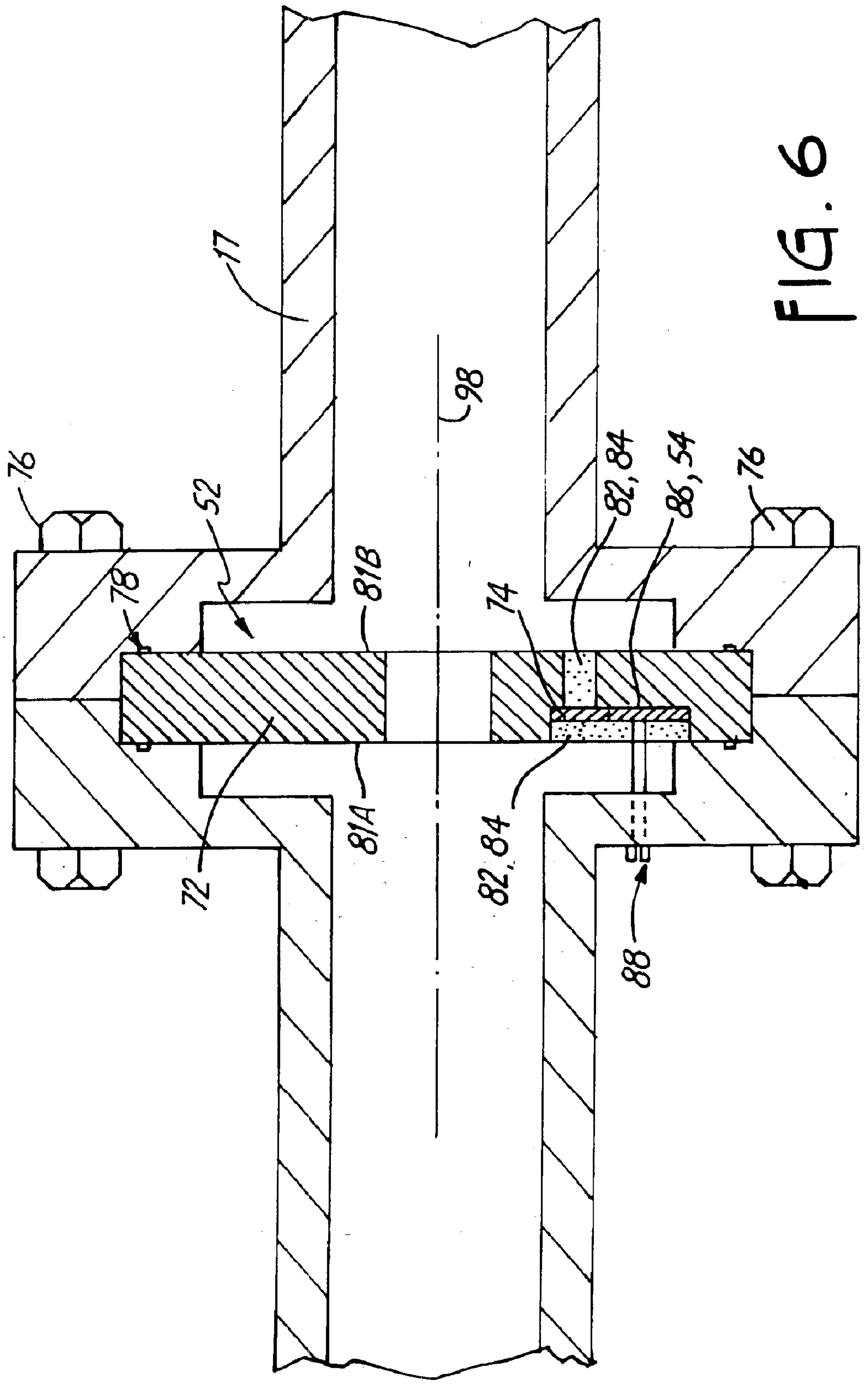
FIG. 6 shows a simplified cross-sectional view of a differential pressure flow sensor positioned inline with a hydraulic fluid flow, in accordance with embodiments of the present invention.

One embodiment of differential pressure flow sensor 52 is shown in the simplified block diagram of FIG. 6. In this example, differential pressure flow sensor 52 is shown installed inline with conduit 17. However, this embodiment of flow sensor 52 could also be installed proximate a port 16 or 60 of hydraulic control valve 13, as shown in FIG. 5. Flow sensor 52 is adapted to produce a discontinuity within the hydraulic fluid flow traveling to and from a cavity, such as first cavity 30 (FIGS. 2A and 2B), and measure a pressure drop across the discontinuity. The pressure drop measurement is indicative of the direction and flow rate $Q_V$ of the hydraulic fluid flow. Furthermore, flow sensor 52 is adapted to produce a first signal that is indicative of the flow rate $Q_V$, as discussed above.

Flow sensor 52 generally includes flow restriction member 72 and differential pressure sensor 74. Flow sensor 52 can be installed in conduit 17 or proximate hydraulic control valve 13 using nuts and bolts 76. O-rings 78 can be used to seal the installation. Flow restriction member 72, shown as an orifice plate having an orifice 80, forms the desired discontinuity in the hydraulic fluid flow by forming a flow restriction. Preferably, flow restriction member 72 is configured to operate in bi-directional fluid flows due to the symmetry of flow restriction member 72. Those skilled in the art will appreciate that other configurations of flow restriction member 72 that can produce the desired pressure drop could be substituted for the depicted flow restriction member 72. These include, for example, orifice plates having concentric and eccentric orifices, plates without orifices, wedge elements consisting of two non-parallel faces which form an apex, or other commonly used bi-directional flow restriction members.

Differential pressure sensor 74 is adapted to produce a differential pressure signal that is indicative of the pressure drop. Differential pressure sensor 74 can comprise two separate absolute or gauge pressure sensors arranged to measure the pressure at first and second sides 81A and 81B of member 72 such that a differential pressure signal is generated by differential pressure sensor 74 that relates to a difference between the outputs from the two sensors. Differential pressure sensor 74 can be a piezoresistive pressure sensor that couples to the pressure drop across flow restriction member 72 by way of openings 82. One of the advantages of this type of differential pressure sensor is that it does not require the use of isolation diaphragms and fill fluid to isolate sensor 74 from the hydraulic fluid. If needed, a coating 84 can be adapted to isolate and protect differential pressure sensor 74 without affecting the sensitivity of differential pressure sensor 74 to the pressure drop. Differential pressure sensor 74 could also be a capacitance-based differential pressure sensor or other suitable differential pressure sensor known in the art.

Another embodiment of flow sensor 52 includes processing electronics 86 that receives a differential pressure signal from differential pressure sensor 74 and produces the first signal that is indicative the flow rate $Q_V$ of the hydraulic fluid flow based upon the differential pressure signal. The first signal can be transferred to calculation module 54 (FIGS. 4 and 5) of measuring device 50 through terminals 88 in accordance with a communication protocol. Flow sensor 52 can include additional sensors, such as temperature and static pressure sensors to provide additional parameters relating to the hydraulic fluid and flow sensor 52. The temperature and static pressure signals can be provided to processing electronics 86 or calculation module 54, which can use the signals to compensate the first or second signal for the environmental conditions. Alternatively, processing electronics 86 can perform the function of calculation module 54 by producing the second signal in response to the differential pressure signal received form differential pressure sensor 74.

Figure 7:
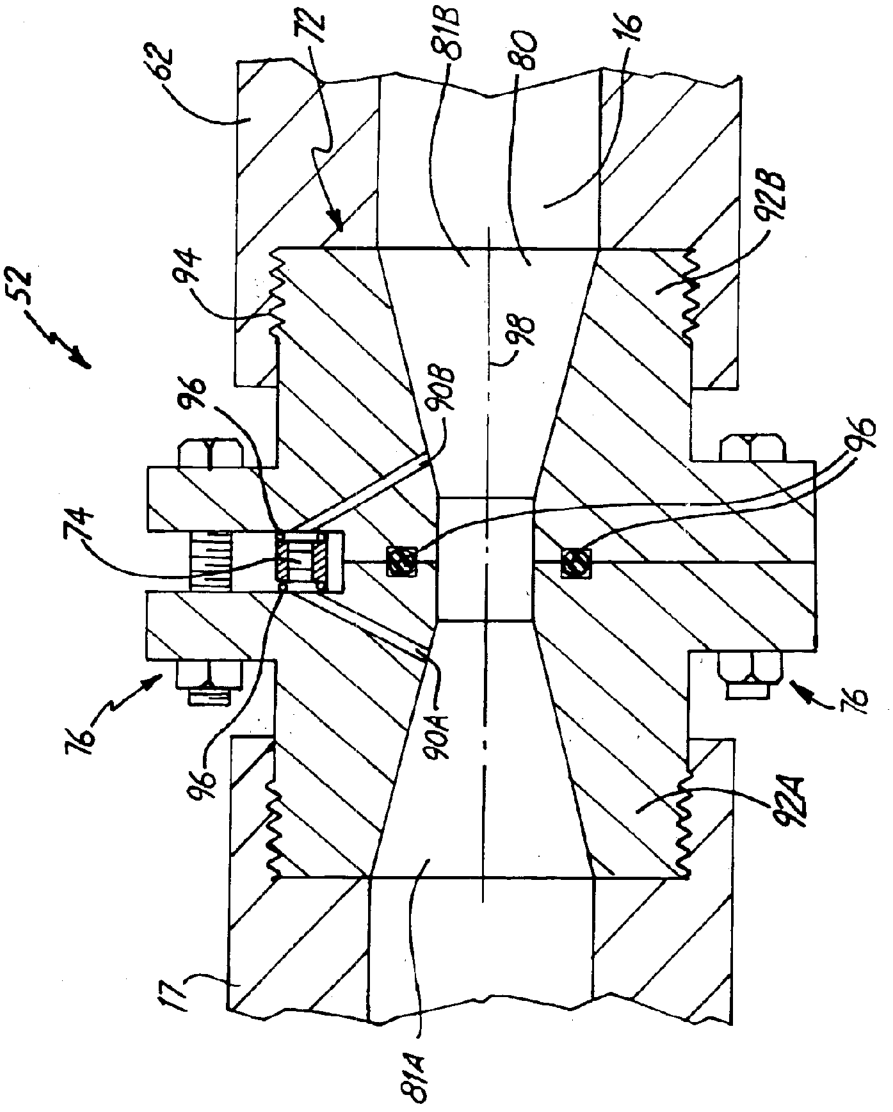
FIG. 7 shows a simplified cross-sectional view of a differential pressure flow sensor in accordance with embodiments of the present invention.

FIG. 7 shows another embodiment of flow sensor 52 coupled to a port 16 of valve body 62 and fluid flow conduit 17. Alternatively, this embodiment of flow sensor 52, as well as the other embodiments discussed herein, could be mounted elsewhere within hydraulic system 10 (FIG. 1) such that it is inline with the hydraulic fluid flow that is to be measured. As with the previous embodiment shown in FIG. 6, this embodiment of flow sensor 52 includes flow restriction member 72 and differential pressure sensor 74. Flow restriction member 72 is preferably a bi-directional flow restriction member that forms a discontinuity within the hydraulic fluid flow traveling between hydraulic control valve 13 and a cavity of a hydraulic actuator 12 thereby producing a pressure drop across first and second sides 81A and 81B, respectively. This embodiment of flow sensor 52 also includes first and second pressure ports 90A and 90B corresponding to first and second sides 81A and 81B, respectively. First and second ports 90A and 90B respectively couple the pressure at first and second sides 81A and 81B to differential pressure sensor 74. Differential pressure sensor 74 is preferably a piezo-resistive pressure sensor, however, other types of pressure sensors may be used as well as mentioned above. Flow restriction member 72 can be formed of first and second flow restriction portions 92A and 92B, each of which have varying flow areas which constrict the fluid flow and form the desired discontinuity. Although second flow restriction portion 92B is shown as having a threaded portion 94 that mates with port 16 of valve body 62, second flow restriction portion 92B could also be formed integral with valve body 62. Bleed screws or drain/vent valves (not shown) can be fluidically coupled to first and second pressure ports 90A and 90B to release unwanted gas and fluid contained therein. Seals 96 can provide leakage protection and retain the static pressure in conduit 17 and hydraulic control valve 13. First and second flow restriction portions 92A and 92B can be joined using a suitable fastener such as the depicted nuts and bolts 76.

Flow sensor 52 is preferably adapted to generate a first signal that is indicative of a flow rate $Q_V$ of the hydraulic fluid flow as well as a direction that the flow is traveling. This is preferably accomplished using a flow restriction member 72 that is symmetric about a horizontal plane 98 running parallel to the hydraulic fluid flow and a vertical plane (not shown) running perpendicular to plane 90 and dividing flow restriction member 72 into equal halves. However, those skilled in the art understand that non-symmetric flow restriction members 72 could also provide the desired bi-directional function. The flow rate $Q_V$ relates to the magnitude of the pressure drop and can be calculated in accordance with known methods. The direction of the hydraulic fluid flow depends on whether the pressure drop is characterized as a positive pressure drop or a negative pressure drop. For example, a positive pressure drop can be said to occur when the pressure at first side 81A is greater than the pressure at second side 81B. This could relate to a positive fluid flow or a fluid flow moving from left to right in the sensors 52 shown in FIGS. 6 and 7, which could indicate a flow moving out of first cavity 30 of hydraulic actuator 12. Accordingly, a negative pressure would occur when the pressure at first side 81A is less than the pressure at second side 81B. The negative pressure drop would then relate to a right-to-left hydraulic fluid flow or one traveling into first cavity 30. Consequently, the pressure drop can be indicative of both the direction of the fluid flow and its flow rate $Q_V$.

Figure 8:
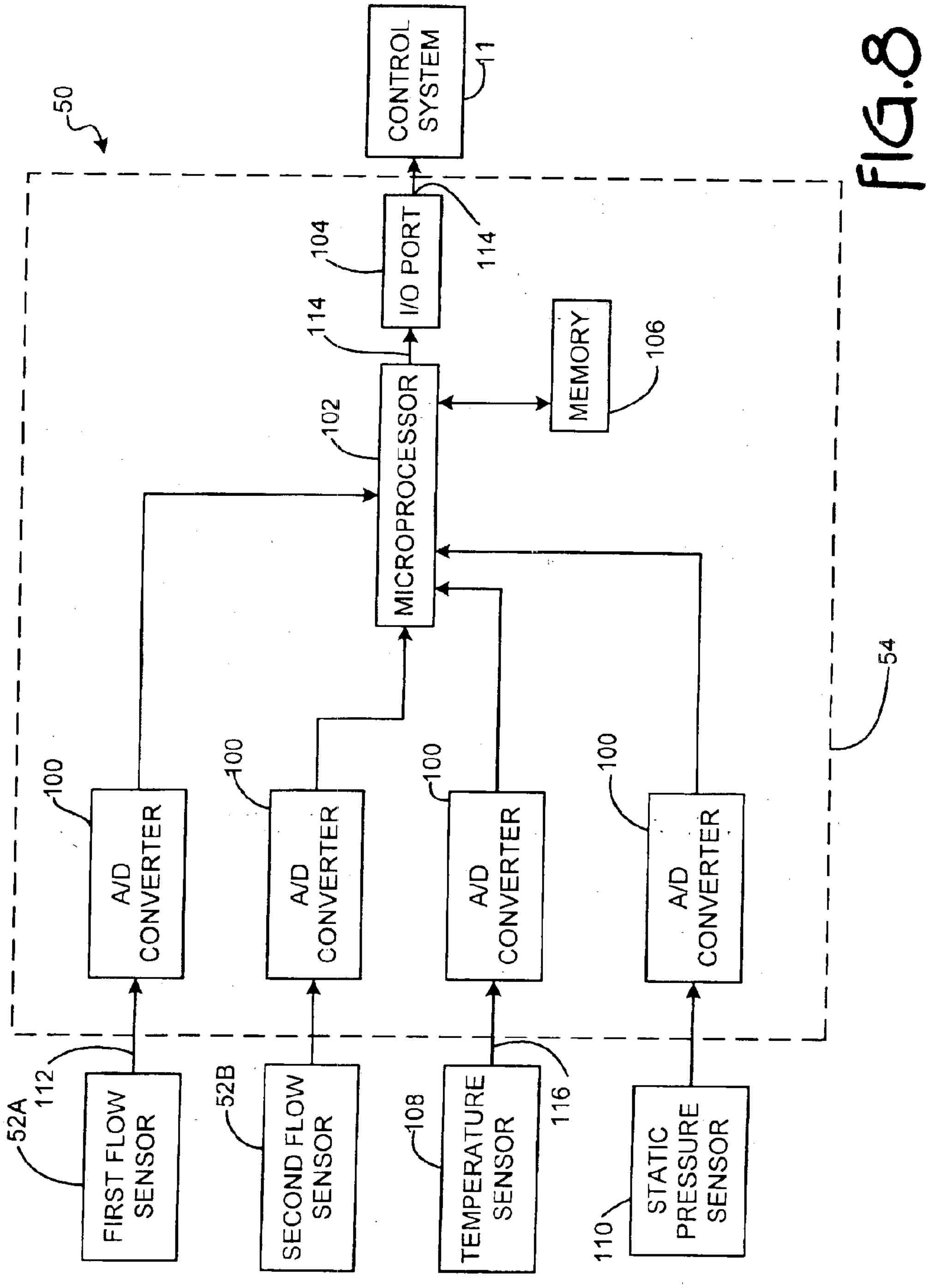
FIG. 8 shows a simplified block diagram of a device for measuring piston position, velocity and/or acceleration in accordance with various embodiments of the present invention.

FIG. 8 shows a simplified block diagram of calculation module 54 of measuring device 50 in accordance with the various embodiments discussed above. Calculation module 54 generally includes one or more analog to digital (A/D) converters 100, microprocessor 102, input/output (I/O) port 104, and memory 106. The optional temperature sensor 108 and static pressure sensor 110 can be provided to module 54 to correct for flow variations due to the temperature and the static pressure of the hydraulic fluid, as mentioned above. Piston position module 54 receives the first signal 112 from a first differential pressure flow sensor 52A, in accordance with an analog communication protocol, at A/D converter 100 which digitizes the first signal. The first signal can be a standard 4–20 mA analog signal that is delivered over, for example, wires 56 (FIG. 4) or wires 68 (FIG. 5). Alternatively, A/D converter 100 can be eliminated from calculation module 54 and microprocessor 102 can receive the first signal directly from flow sensor 52A when the first signal is in a digital form that is provided in accordance with a digital communication protocol. Suitable digital communication protocols, which can be used with the present invention include, for example, Highway Addressable Remote Transducer (HART®), FOUNDATION™ Fieldbus, Profibus PA, Profibus DP, Device Net, Controller Area Network (CAN), Asi, and other suitable digital communication protocols.

Microprocessor 102 uses the digitized first signal, which is received from either A/D converter 100 or flow sensor 52, to determine the position, velocity, and/or acceleration of piston 20 within hydraulic cylinder 18 (FIGS. 2A and 2B). Memory 106 can be used to store various information, such as the current position $x_0$ of piston 20, an account of the volume $V_1$ of hydraulic fluid contained in first cavity 30, applicable cross-sectional areas of hydraulic cylinder 18, such as area $A_1$, and any other information that could be useful to calculation module 54. Microprocessor 102 produces the second signal 114 which is indicative of the position, velocity, and/or acceleration of piston 20 within hydraulic cylinder 18. The second signal can be provided to control system 11 through I/O port 104.

As mentioned above, calculation module 54 can also receive differential pressure, static pressure and temperature signals from flow sensor 52, or from separate temperature (108) and static pressure (110) sensors as shown in FIG. 8. These signals can be used by microprocessor 102 to compensate for spikes or anomalies in the flow rate signal which can occur when the piston starts or stops as well as the environmental conditions in which flow sensor 52 is operating. Temperature sensor 108 can be adapted to measure the temperature of the hydraulic fluid, the operating temperature of differential pressure sensor 74, and/or the temperature of flow sensor 52. Temperature sensor 108 produces the temperature signal 116 that is indicative of the sensed temperature, which can be used by calculation module 54 in the calculation of the flow rate $Q_V$. Temperature sensor 108 can be integral with or embedded in flow restriction member 72 (FIGS. 6 and 7). The static pressure signal 118 from static pressure sensor 110 can be used by calculation module 54 to correct for compressibility effects in the hydraulic fluid.

In another embodiment of the invention, additional flow sensors 52, such as second flow sensor 52B, can be included so that the hydraulic fluid flows coupled to first and second cavities 30 and 32 (FIG. 4), respectively, or at different ports 16 (FIG. 5) of a hydraulic control valve 13 can be measured. The first signals received from the multiple flow sensors 52 can be used for error checking or diagnostic purposes.

In summary, the present invention provides a method and device for measuring the position, velocity, and/or acceleration of a hydraulic piston operating within a hydraulic system. These measurements are taken based upon a differential pressure measurement taken across a discontinuity that is placed in a hydraulic fluid flow which is used to actuate the piston. The differential pressure measurement is then used to establish a flow rate of the hydraulic fluid flow, which can be used to determine the position, velocity, and/or acceleration of a piston contained within a hydraulic cylinder of a hydraulic actuator.

The measuring device includes a differential pressure flow sensor and a calculation module. The differential pressure flow sensor is positioned inline with a cavity of the hydraulic actuator that receives the hydraulic fluid flow. The flow sensor can be positioned proximate a port of a hydraulic control valve or a port of the hydraulic actuator corresponding to the cavity, or inline with fluid flow conduit through which the hydraulic fluid flow travels. The flow sensor produces a first signal which is indicative of the flow rate of the hydraulic fluid flow and is based upon a differential pressure measurement. The calculation module is adapted to receive the first signal and produce a second signal based thereon, which is indicative of the position, velocity, and/or the acceleration of the piston.

Although the present invention has been described with reference to preferred embodiments, workers skilled in the art will recognize that changes may be made in form and detail without departing from the spirit and scope of the invention.

What is claimed is:

1. A method of measuring at least one of position, velocity, and acceleration of a piston slidably contained within a hydraulic cylinder of a hydraulic actuator, the method comprising:

(a) measuring a differential pressure across a discontinuity positioned in a hydraulic fluid flow traveling into and out of a first cavity which is defined by the piston and the hydraulic cylinder;

(b) calculating a flow rate of the hydraulic fluid flow into and out of the first cavity as a function of the differential pressure; and (c) calculating at least one of position, velocity, and acceleration of the piston as a function of the flow rate.

2. The method of claim 1, including a step (d) of producing an output signal that is indicative of at least one of the position, the velocity, and the acceleration of the piston within the hydraulic cylinder.

3. The method of claim 1, including a step of measuring a temperature of the hydraulic fluid.

4. The method of claim 3, wherein the flow rate is further calculated as a function of the temperature of the hydraulic fluid in the calculating step (b).

5. The method of claim 1, wherein the measuring step (a) includes subtracting a first measured static pressure from a second measured static pressure, wherein the first and second measured static pressures are located on opposite sides of the discontinuity.

6. A device for measuring at least one of position, velocity, and acceleration of a piston slidably contained within a hydraulic cylinder of a hydraulic actuator, the device comprising:

a differential pressure flow sensor positioned inline with a hydraulic fluid flow and adapted to measure a pressure drop across a discontinuity positioned in the hydraulic fluid flow, the differential pressure flow sensor having a first signal, based upon the pressure drop, which is indicative of a flow rate of the hydraulic fluid flow traveling into and out of a first cavity defined by the piston and the hydraulic cylinder; and a calculation module adapted to receive the first signal and responsively provide a second signal, which is indicative of at least one of the position, the velocity, and the acceleration of the piston.

7. The device of claim 6, wherein the first signal relates to a parameter that is selected from a group consisting of the pressure drop, the flow rate of the hydraulic fluid flow, and a compensated flow rate of the hydraulic fluid flow.

8. The device of claim 6, wherein the differential pressure flow sensor includes:

a flow restriction member positioned within the hydraulic fluid flow and adapted to produce a pressure drop; and a differential pressure sensor configured to measure the pressure drop and responsively produce a differential pressure signal, wherein the first signal is based upon the differential pressure signal.

9. The device of claim 6, wherein the differential pressure flow sensor is a bi-directional differential pressure flow sensor, wherein the first signal is further indicative of a direction of the hydraulic fluid flow.

10. The device of claim 8, wherein the flow restriction member is a bi-directional flow restriction member.

11. The device of claim 8, wherein the differential pressure sensor is embedded in the flow restriction member.

12. The device of claim 8, wherein the differential pressure flow sensor further includes processing electronics adapted receive the differential pressure signal and produce the first signal as a function of the differential pressure signal.

13. The device of claim 6, wherein the first signal is produced in accordance with a communication protocol selected from a group consisting of an analog communication protocol, a digital communication protocol, and a wireless communication protocol.

14. The device of claim 6, further comprising:

a temperature sensor adapted to produce a temperature signal that is indicative of a temperature of the hydraulic fluid; and the second signal is further a function of the temperature signal.

15. The device of claim 6, wherein the calculation module includes:

an analog-to-digital (A/D) converter adapted to receive the first signal and convert the first signal into a digitized signal; and a microprocessor electrically coupled to the A/D converter and adapted to receive the digitized flow rate signal and produce the second signal as a function of the digitized signal.

16. The device of claim 8, wherein:

the differential pressure sensor includes first and second pressure sensors which respectively produce first and second pressure signals relating to pressures at first and second sides of the flow restriction member; and the differential pressure signal is related to the difference between the first and second pressure signals.

17. The device of claim 10, wherein the first signal is further indicative of a direction of the hydraulic fluid flow.

18. The device of claim 6, further comprising:

a valve body having a valve port inline with the first cavity through which the hydraulic fluid flow travels; wherein the differential pressure flow sensor is positioned proximate the valve port.

19. The device of claim 18, wherein the differential pressure flow sensor includes a flow restriction member positioned within the hydraulic fluid and includes first and second flow restriction portions.

20. The device of claim 19, wherein at least one of the flow restriction portions is integral with the valve body.

21. The device of claim 6, wherein the calculating module is further adapted to filter transient portions of the first signal relating to anomalies of the hydraulic fluid flow.

22. A hydraulic system comprising:

a hydraulic cylinder having a port coupled to a hydraulic fluid flow;

a piston slidably received in the hydraulic cylinder, wherein the hydraulic fluid flow is in fluid communication with a first cavity, defined by the piston and the hydraulic cylinder, through the port;

a valve including a valve body and a valve port that is fluidically coupled to the port of the hydraulic cylinder, wherein the hydraulic fluid flow travels through the valve port into and out of the hydraulic cylinder;

a differential pressure flow sensor positioned for measurement of the hydraulic fluid flow flowing into and out of the hydraulic cylinder and having a first signal which is indicative of a flow rate of the hydraulic fluid flow traveling into or out of the first cavity; and a calculation module adapted to receive the first signal and responsively provide a second signal, as a function of the first signal, which is indicative of at least one of the position, the velocity, and the acceleration of the piston.

23. The system of claim 22, wherein the first signal relates to a parameter that is selected from a group consisting of a differential pressure corresponding to a pressure drop across a discontinuity positioned within the hydraulic fluid flow, the flow rate of the hydraulic fluid flow, a mass flow rate of the hydraulic fluid flow, and a volume flow rate of the hydraulic fluid flow.

24. The system of claim 22, wherein the differential pressure flow sensor includes:

a flow restriction member positioned within the hydraulic fluid flow and adapted to produce a pressure drop; and a differential pressure sensor configured to measure the pressure drop and responsively produce a differential pressure signal, wherein the first signal is based upon the differential pressure signal.

25. The system of claim 22, wherein the differential pressure flow sensor is a bi-directional differential pressure flow sensor, wherein the first signal is further indicative of a direction of the hydraulic fluid flow.

26. The system of claim 24, wherein the differential pressure flow sensor further includes processing electronics adapted receive the differential pressure signal and produce the first signal as a function of the, differential pressure signal.

27. The system of claim 22, wherein the first signal is produced in accordance with a communication protocol selected from a group consisting of an analog communication protocol, a digital communication protocol, and a wireless communication protocol.

28. The system of claim 22, further comprising:

a temperature sensor adapted to produce a temperature signal that is indicative of a temperature of the hydraulic fluid; and the second signal is further a function of the temperature signal.

29. The system of claim 22, wherein the calculation module includes:

an analog-to-digital (A/D) converter adapted to receive the first signal and convert the first signal into a digitized signal; and a microprocessor electrically coupled to the A/D converter and adapted to receive the digitized flow rate signal and produce the second signal as a function of the digitized signal.

30. The system of claim 22, wherein the differential pressure flow sensor is coupled to the valve port.

31. The system of claim 30, wherein the differential pressure flow sensor includes a flow restriction member positioned within the hydraulic fluid and includes first and second flow restriction portions; and wherein at least one of the flow restriction portions is integral with the valve body.

32. The system of claim 22, wherein the calculating module is further adapted to filter transient portions of the first signal relating to anomalies of the hydraulic fluid flow.

33. A hydraulic system comprising:

a plurality of hydraulic cylinders, each cylinder having a position therein and having a cylinder cavity defined by a cylinder wall and the piston, the cylinder cavity fluidically coupled to a fluid port;

a source of hydraulic fluid operably coupled to the fluid port of each of the plurality of hydraulic cylinders;

valving interposed between the source of hydraulic fluid and each hydraulic cylinder;

a plurality of differential pressure flow sensors positioned for measurement of hydraulic fluid flow flowing into and out of each cylinder cavity of the plurality of hydraulic cylinders; and a calculation module adapted to receive a signal from each differential pressure flow sensor and responsively provide an output signal based upon at least one of the position, the velocity and the acceleration of at least one of the plurality of hydraulic cylinders.

* * * * *

UNITED STATES PATENT AND TRADEMARK OFFICE

CERTIFICATE OF CORRECTION

PATENT NO. : 6,848,323 B2
DATED : February 1, 2005
INVENTOR(S) : Terrance F. Krouth et al.

It is certified that error appears in the above-identified patent and that said Letters Patent is hereby corrected as shown below:

Column 12,
Line 28, delete "," after "the"

Signed and Sealed this

Ninth Day of August, 2005

JON W. DUDAS
*Director of the United States Patent and Trademark Office*